US012810115B2

(12) United States Patent
Zhou et al.

(10) Patent No.: US 12,810,115 B2
(45) Date of Patent: Nov. 24, 2026

(54) NEURAL ARCHITECTURE AND HARDWARE ACCELERATOR SEARCH

(71) Applicant: Google LLC, Mountain View, CA (US)

(72) Inventors: Yanqi Zhou, Sunnyvale, CA (US); Amir Yazdanbakhsh, San Jose, CA (US); Berkin Akin, Burlingame, CA (US); Daiyi Peng, Cupertino, CA (US); Yuxiong Zhu, San Jose, CA (US); Mingxing Tan, Newark, CA (US); Xuanyi Dong, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 844 days.

(21) Appl. No.: 18/029,849

(22) PCT Filed: Oct. 1, 2021

(86) PCT No.: PCT/US2021/053247

§ 371 (c)(1),
(2) Date: Mar. 31, 2023

(87) PCT Pub. No.: WO2022/072890

PCT Pub. Date: Apr. 7, 2022

(65) Prior Publication Data

US 2024/0005129 A1 Jan. 4, 2024

Related U.S. Application Data

(60) Provisional application No. 63/087,143, filed on Oct. 2, 2020.

(51) Int. Cl.
*G06N 3/045* (2023.01)
*G06N 3/044* (2023.01)
(Continued)

(52) U.S. Cl.
CPC ............ *G06N 3/045* (2023.01); *G06N 3/044* (2023.01); *G06N 3/0464* (2023.01); *G06N 3/063* (2013.01); *G06N 3/092* (2023.01)

(58) Field of Classification Search
CPC ........ G06N 3/044; G06N 3/063; G06N 3/092; G06N 3/006; G06N 3/0442; G06N 3/08;
(Continued)

(56) References Cited

U.S. PATENT DOCUMENTS

| | | | | |
|---|---|---|---|---|
| 9,443,517 | B1 * | 9/2016 | Foerster | G10L 15/08 |
| 2008/0262823 | A1 * | 10/2008 | Oslake | G06F 8/20 703/22 |

(Continued)

FOREIGN PATENT DOCUMENTS

| | | | |
|---|---|---|---|
| CN | 108021983 | A | 5/2018 |
| CN | 108090560 | A | 5/2018 |
| CN | 109389214 | A | 2/2019 |

OTHER PUBLICATIONS

Weiwei et al.; You Only Search Once: A Fast Automation Framework for Single-Stage DNN/Accelerator Co-design; 2020; IEEE; All (Year: 2020).*

(Continued)

*Primary Examiner* — Phenuel S Salomon
(74) *Attorney, Agent, or Firm* — Fish & Richardson P.C.

(57) ABSTRACT

Methods, systems, and apparatus, including computer programs encoded on computer storage media, for jointly determining neural network architectures and hardware accelerator architectures. In one aspect, a method includes: generating, using a controller policy, a batch of one or more output sequences, each output sequence in the batch defining a respective architecture of a child neural network and a respective architecture of a hardware accelerator; for each output sequence in the batch: training a respective instance of the child neural network having the architecture defined (Continued)

by the output sequence; evaluating a network performance of the trained instance of the child neural; and evaluating an accelerator performance of a respective instance of the hardware accelerator having the architecture defined by the output sequence to determine an accelerator performance metric for the instance of the hardware accelerator; and using the network performance metrics and the accelerator performance metrics to adjust the controller policy.

26 Claims, 4 Drawing Sheets

(51) Int. Cl.
*G06N 3/0464* (2023.01)
*G06N 3/063* (2023.01)
*G06N 3/092* (2023.01)

(58) Field of Classification Search
CPC .......... G06N 3/082; G06N 3/09; G06N 20/20; G06F 30/27; G06F 30/331; G06F 30/337
See application file for complete search history.

(56) References Cited

U.S. PATENT DOCUMENTS

| | | | | |
|---|---|---|---|---|
| 2016/0174902 | A1* | 6/2016 | Georgescu | A61B 5/055 600/408 |
| 2020/0082275 | A1* | 3/2020 | Sun | G06N 3/08 |
| 2021/0073612 | A1* | 3/2021 | Vahdat | G06F 7/57 |
| 2021/0081806 | A1* | 3/2021 | Chai | G06N 3/045 |
| 2021/0089887 | A1* | 3/2021 | Johnson | G06N 3/084 |
| 2021/0150407 | A1* | 5/2021 | Xu | G06N 3/08 |

OTHER PUBLICATIONS

Sandler et al.; MobileNetV2: Inverted Residuals and Linear Bottlenecks; 2018; IEEE; All (Year: 2018).*
Zoph et al.; Learning Transferable Architectures for Scalable Image Recognition ; 2018; IEEE; All (Year: 2018).*
Achararit et al., "APNAS: Accuracy-and-Performance-Aware Neural Architecture Search for Neural Hardware Accelerators," IEEE Access, Sep. 2020, 8:165319-165334.
Ansel et al., "OpenTuner: An extensible framework for program autotuning," Paper, Presented at Proceedings of the ACM Conference: Parallel Architectures and Compilation, Edmonton, Canada, Aug. 24-27, 2014, pp. 303-315.
Balaprakash et al., "AutoMOMML: Automatic multi-objective modeling with machine learning," Paper, Presented at Proceedings of the International Conference on High Performance Computing, Frankfurt, Germany, Jun. 19-23, 2016; LNTCS, 2016, 9697:219-239.
Bender et al., "Can weight sharing outperform random architecture search? An investigation with TuNAS," Paper, Presented at Proceedings of the IEEE/CVF Conference: Computer Vision and Pattern Recognition, Seattle, WA, Jun. 13-19, 2020, pp. 14323-14332.
Cai et al., "ProxylessNAS: Direct Neural Architecture Search on Target Task and Hardware," CoRR, Submitted on Dec. 2, 2018, arXiv:1812.00332v1, pp. 1-13.
Chen et al., "Eyeriss: A Spatial Architecture for Energy-Efficient Dataflow for Convolutional Neural Networks," Paper, Presented at Proceedings of the ACM/IEEE Conference: Annual International Symposium on Computer Architecture, Seoul, South Korea, Jun. 18-22, 2016, 13 pages.
Chen et al., "You Only Search Once: A Fast Automation Framework for Single-Stage DNN/Accelerator Co-design," CoRR, Submitted on May 14, 2020, arXiv:2005.07075v1, 6 pages.
Choi et al., "DANCE: Differentiable Accelerator/Network Co-Exploration," CoRR, Submitted on Sep. 14, 2020, arXiv:2009.06237v1, 9 pages.
Cloud.google.com [online], "Accelerate AI development with Google Cloud TPUs," Apr. 18, 2021, retrieved on Feb. 19, 2025, retrieved from URL <https://cloud.google.com/tpu?hl=en>, 9 pages.
Cong et al., "Automated Accelerator Generation and Optimization with Composable, Parallel and Pipeline Architecture," Paper, Presented at Proceedings of the ACM/ESDA/IEEE Conference: Design Automation Conference, San Francisco, CA, Jun. 24-28, 2018, 6 pages.
Dai et al., "ChamNet: Towards Efficient Network Design through Platform-Aware Model Adaptation," Paper, Presented at Proceedings of the IEEE/CVF Conference: Computer Vision and Pattern Recognition, Long Beach, CA, Jun. 15-20, 2019, pp. 11398-11407.
Elfwing et al., "Sigmoid-weighted linear units for neural network function approximation in reinforcement learning," Neural Networks, Nov. 2018, 107:3-11.
Gupta et al., "Accelerator-aware Neural Network Design using AutoML," CoRR, Submitted on Mar. 5, 2020, arXiv:2003.02838v1, 5 pages.
Howard et al. "MobileNets: Efficient Convolutional Neural Networks for Mobile Vision Applications," CoRR, Submitted on Apr. 17, 2017, arXiv:1704.04861v1, pp. 1-9.
International Preliminary Report on Patentability in International Appln. No. PCT/US2021/053247, mailed on Apr. 13, 2023, 12 pages.
International Search Report and Written Opinion in International Appln. No. PCT/US2021/053247, mailed on Feb. 2, 2022, 17 pages.
Iqbal et al., "FlexiBO: Cost-Aware Multi-Objective Optimization of Deep Neural Networks," CoRR, Submitted on Jan. 18, 2020, arXiv:2001.06588v1, 19 pages.
Jiang et al., "Hardware/software co-exploration of neural architectures," IEEE Transactions on Computer-Aided Design of Integrated Circuits and Systems, Dec. 2020, 39(12):4805-4815.
Jiang et al., "Standing on the Shoulders of Giants: Hardware and Neural Architecture Co-Search with Hot Start," CoRR, Submitted on Jul. 17, 2020, arXiv:2007.09087v1, pp. 1-13.
Koeplinger et al., "Spatial: A language and compiler for application accelerators," Paper, Presented at the Proceedings of ACM Conference: Programming Language Design and Implementation, Philadelphia, PA, Jun. 18-22, 2018, 16 pages.
Kwon et al., "Co-Design of Deep Neural Nets and Neural Net Accelerators for Embedded Vision Applications," CoRR, Submitted on Apr. 20, 2018, arXiv:1804.10642v1, 6 pages.
mlperf.org [online as mlcommons.org], "MLPerf," available on or before Mar. 5, 2020, via Internet Archive: Wayback Machine URL <https://web.archive.org/web/20200305131006/https://mlperf.org/>, retrieved on Feb. 19, 2025, retrieved from URL <https://mlcommons.org/benchmarks/>, 6 pages.
Nardi et al., "Practical design space exploration," Paper, Presented at Proceedings of the IEEE Conference: Symposium on Modeling, Analysis, and Simulation of Computer and Telecommunication Systems, Rennes, France, Oct. 21-25, 2019, pp. 347-358.
Office Action in European Appln. No. 21806867.4, mailed on Feb. 7, 2025, 11 pages.
Parsa et al., "Bayesian multi-objective hyperparameter optimization for accurate, fast, and efficient neural network accelerator design," Frontiers in Neuroscience, Jul. 2020, 14:667, pp. 1-16.
Ramachandran et al., "Searching for activation functions," CoRR, Submitted on Oct. 27, 2017, arXiv:1710.05941v2, pp. 1-13.
Sandler et al., "Inverted Residuals and Linear Bottlenecks: Mobile Networks for Classification, Detection and Segmentation," CoRR, Submitted on Jan. 16, 2018, arXiv:1801.04381v2, 14 pages.
Sandler et al., "MobileNetV2: Inverted residuals and linear bottlenecks," Paper, Presented at the Proceedings of the IEEE/CVF Conference: Computer Vision and Pattern Recognition, Salt Lake City, UT, Jun. 18-23, 2018, pp. 4510-4520.
Schulman et al., "Proximal policy optimization algorithms," CoRR, Submitted on Aug. 28, 2017, arXiv:1707.06347v2, pp. 1-12.
Spec.org [online], "SPEC CPU® 2006 benchmark," Sep. 2011, retrieved on Feb. 19, 2025, retrieved from URL <https://www.spec.org/cpu2006/>, 4 pages.
Sun et al., "Automatically Designing CNN Architectures Using the Genetic Algorithm for Image Classification," IEEE Transactions on Cybernetics, Sep. 2020, 50(9):3840-3854.

(56) References Cited

OTHER PUBLICATIONS

Tan et al., "Efficientnet: Rethinking model scaling for convolutional neural networks," Paper, Presented at Proceedings of the International Conference on Machine Learning, Jun. 9-15, 2019; PMLR, 2019, 97, 10 pages.
Tan et al., "MnasNet: Platform-Aware Neural Architecture Search for Mobile," CoRR, Submitted on Jul. 31, 2018, arXiv:1807.11626v1, pp. 1-9.
Tan et al., "MnasNet: Platform-Aware Neural Architecture Search for Mobile," Paper, Presented at Proceedings of the IEEE/CVF Conference: Computer Vision and Pattern Recognition, Long Beach, CA, Jun. 15-20, 2019, pp. 2820-2828.
Wu et al., "FBNet: Hardware-Aware Efficient ConvNet Design via Differentiable Neural Architecture Search," Paper, Presented at Proceedings of the IEEE/CVF Conference: Computer Vision and Pattern Recognition, Long Beach, CA, Jun. 15-20, 2019, pp. 10734-10742.
Yang et al., "Co-Exploration of Neural Architectures and Heterogeneous ASIC Accelerator Designs Targeting Multiple Tasks," CoRR, Submitted on Feb. 10, 2020, arXiv:2002.04116v1, 7 pages.
Yang et al., "Deep Learning Training at Scale Spring Crest Deep Learning Accelerator (Intel® Nervana™ NNP-T)," Presentation, Presented at Proceedings of the IEEE Conference: Hot Chips, Cupertino, CA, Aug. 18-20, 2019, 20 pages.
Yang et al., "Synetgy: Algorithm-hardware Co-design for ConvNet Accelerators on Embedded FPGAs," CoRR, Submitted on Dec. 19, 2018, arXiv:1811.08634v2, pp. 1-10.
Yu et al., "Software-defined Design Space Exploration for an Efficient DNN Accelerator Architecture," CoRR, Submitted on Jan. 16, 2020, arXiv:1903.07676v2, pp. 1-13.
Zoph et al., "Learning Transferable Architectures for Scalable Image Recognition," CoRR, Submitted on Dec. 1, 2017, arXiv:1707.07012v3, 14 pages.
Zoph et al., "Learning transferable architectures for scalable image recognition," Paper, Presented at Proceedings of the IEEE/CVF Conference: Computer Vision and Pattern Recognition, Las Vegas, NV, Jun. 27-30, 2016, pp. 8697-8710.
Office Action in Chinese Appln. No. 202180063841.5, mailed on Nov. 17, 2025, 24 pages (with English translation).

* cited by examiner

NEURAL ARCHITECTURE AND HARDWARE ACCELERATOR SEARCH

CROSS-REFERENCE TO RELATED APPLICATIONS

This application is a National Stage Application under 35 U.S.C. § 371 and claims the benefit of International Application No. PCT/US2021/053247, filed Oct. 1, 2021, which claims priority to U.S. Provisional Application No. 63/087,143, filed on Oct. 2, 2020. The disclosure of the prior application is considered part of and is incorporated by reference in the disclosure of this application.

BACKGROUND

This specification relates to determining neural network architectures and hardware accelerator designs.

Neural networks are machine learning models that employ one or more layers of nonlinear units to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

Hardware accelerators are computing devices having specialized hardware configured to perform specialized computations, e.g., graphics processing units ("GPUs"), field-programmable gate arrays ("FGPAs"), and application-specific integrated circuits ("ASICs"), including tensor processing units ("TPUs").

SUMMARY

This specification describes a system implemented as computer programs on one or more computers in one or more locations that can jointly (e.g., simultaneously) determine (i) an optimal network architecture for a neural network configured to perform a particular machine learning task and (ii) an optimal hardware architecture for a hardware accelerator that is (part of) a target computing device on which the neural network is to be implemented.

Depending on the task, the neural network can be configured, i.e., through training, to receive any kind of digital data input and to generate any kind of score, classification, or regression output based on the input.

Once trained, the neural network can be implemented on the target computing device that in turn includes one or more hardware accelerators. Hardware accelerators are computing devices that include specialized hardware for performing certain types of operations, e.g., matrix multiplication, more efficiently over non-specialized—or "general purpose"—computing devices. Different hardware accelerators can have different hardware characteristics, e.g., in terms of number of compute units, amount of parallelism, compute to memory ratio, bandwidth, etc.

As one example, the target computing device that includes one or more hardware accelerators can be a single, specific edge device, e.g., a mobile phone, a smart speaker or another embedded computing device, or other edge device. As a particular example, the edge device can be a mobile phone or other device with a specific type of hardware accelerator or other computer chip on which the neural network will be deployed.

As another example, the target computing device that includes one or more hardware accelerators can be a set of multiple hardware accelerator devices, e.g., ASICs, FPGAs, or tensor processing units (TPUs) on a real-world agent, e.g., a vehicle, e.g., a self-driving car, or a robot.

As yet another example, the target computing device that includes one or more hardware accelerators can be a set of hardware accelerators in a data center.

In general, one innovative aspect of the subject matter described in this specification can be embodied in a method comprising generating, using a controller policy, a batch of one or more output sequences, each output sequence in the batch defining (i) a respective architecture of a child neural network that is configured to perform a particular neural network task and (ii) a respective architecture of a hardware accelerator on which a trained instance of the child neural network is to be implemented; for each output sequence in the batch: training a respective instance of the child neural network having the architecture defined by the output sequence to perform the particular neural network task; evaluating a network performance of the trained instance of the child neural network on the particular neural network task to determine a network performance metric for the trained instance of the child neural network on the particular neural network task; and evaluating an accelerator performance of a respective instance of the hardware accelerator having the architecture defined by the output sequence to determine an accelerator performance metric for the instance of the hardware accelerator on supporting a performance of the trained instance of the child neural network having the architecture defined by the output sequence on the particular neural network task; and using (i) the network performance metrics for the trained instances of the child neural network and (ii) the accelerator performance metrics for the instances of the hardware accelerators to adjust the controller policy.

The controller policy may be implemented using a controller neural network having a plurality of controller network parameters; and adjusting the controller policy may comprise adjusting current values of the plurality of controller network parameters.

Using (i) the network performance metrics for the trained instances of the child neural network and (ii) the accelerator performance metrics for the instances of the hardware accelerators to adjust the controller policy may comprise: training, using a reinforcement learning technique, the controller neural network to generate output sequences that result in child neural networks having increased network performance metrics and hardware accelerators having increased accelerator performance metrics.

The reinforcement learning technique may be a proximal policy optimization (PPO) technique.

Each output sequence may comprise a value for a respective hyperparameter of the child neural network at each of a first plurality of time steps.

Each output sequence may comprise a value for a respective hardware parameter of the hardware accelerator at each of a second plurality of time steps.

The controller neural network may be a recurrent neural network that comprises: one or more recurrent neural network layers that are configured to, for a given output sequence and at each time step: receive as input the value of hyperparameter or hardware parameter at the preceding time step in the given output sequence, and to process the input to update a current hidden state of the recurrent neural network; and a respective output layer for each time step, wherein each output layer is configured to, for the given output sequence: receive an output layer input comprising the updated hidden state at the time step and to generate an output for the time step that defines a score distribution over possible values of the hyperparameter or hardware parameter at the time step.

Generating, using the controller policy, a batch of one or more output sequences may comprise, for each output sequence in the batch and for each of the plurality of time steps: providing as input to the controller neural network the value of the hyperparameter or hardware parameters at the preceding time step in the output sequence to generate an output for the time step that defines a score distribution over possible values of the hyperparameter or hardware parameter at the time step; and sampling from the possible values in accordance with the score distribution to determine the value of the hyperparameter or hardware parameter at the time step in the output sequence.

The particular neural network task may be an object classification and/or detection task, an object pose estimation task, or a semantic segmentation task; the child neural network may be a convolutional neural network that includes one or more depthwise separable convolution layers; and the hyperparameters may include hyperparameters for each depthwise separable convolution layers in the child neural network.

The child neural network may include one or more inverted residual layers and one or more linear bottleneck layers; and the hyperparameters may include hyperparameters for each inverted residual layers and linear bottleneck layers in the child neural network.

The respective hardware characteristics of the hardware accelerator may comprise one or more of: a bandwidth of the hardware accelerator, a number of processing elements included in the hardware accelerator, a layout of the processing elements on the hardware accelerator, a number of single-instruction multiple-data (SIMD) style multiply-accumulate (MAC) in each processing element, a number of compute lanes in each processing element, a size of a shared memory in each processing element, or a size of a register file in each processing element.

The accelerator performance metric for the instance of the hardware accelerator on supporting a performance of the trained instance of the child neural network may comprise one or more of: an estimated area of the hardware accelerator, an estimated power consumption of the hardware accelerator, or an estimated latency of the neural network on performing the particular neural network task when being deployed on the hardware accelerator.

Evaluating an accelerator performance of a respective instance of the hardware accelerator having the architecture defined by the output sequence to determine an accelerator performance metric for the instance of the hardware accelerator on supporting a performance of the trained instance of the child neural network having the architecture defined by the output sequence on the particular neural network task may comprise: determining, based on using a cycle-accurate performance simulator and from (i) the respective architecture of the child neural network and (ii) the respective architecture of the hardware accelerator defined by the batch of output sequences, the estimated latency of the neural network on performing the particular neural network task when being deployed on the hardware accelerator.

Evaluating an accelerator performance of a respective instance of the hardware accelerator having the architecture defined by the output sequence to determine an accelerator performance metric for the instance of the hardware accelerator on supporting a performance of the trained instance of the child neural network having the architecture defined by the output sequence on the particular neural network task may comprise: determining, based on using an analytical area estimator and from the respective architecture of the hardware accelerator defined by the batch of output sequences, the estimated area of the hardware accelerator.

Using (i) the network performance metrics for the trained instances of the child neural network and (ii) the accelerator performance metrics for the instances of the hardware accelerators to adjust the current values of the controller network parameters of the controller neural network may comprise: assigning different weights to the one or more of accelerator performance metrics; and adjusting, according to the different weights, the current values of the controller network parameters of the controller neural network.

Using (i) the network performance metrics for the trained instances of the child neural network and (ii) the accelerator performance metrics for the instances of the hardware accelerators to adjust the controller policy further may comprise: fixing the network performance metric for the trained instance of the child neural network on the particular neural network task and using only the determined accelerator performance metrics for the instances of the hardware accelerators to adjust the current values of the controller network parameters of the controller neural network.

The method may further comprise generating, in accordance with the adjusted values of the controller network parameters, a final output sequence that defines a final architecture of the child neural network.

The method may further comprise performing the particular neural network task for received network inputs by processing the received network inputs using a child neural network having the final architecture.

Another innovative aspect of the subject matter described in this specification can be embodied in a method comprising receiving data specifying one or more target hardware constraints of a hardware accelerator on which a neural network for performing a particular machine learning task is to be deployed; receiving training data and validation data for the particular machine learning task; and selecting, from a space of candidate network architectures and using the training data and the validation data, a network architecture for the neural network for performing the particular machine learning task, selecting, from a space of candidate hardware architectures, a hardware architecture for the hardware accelerator on which the neural network performing the particular machine learning task is to be deployed, wherein each candidate network architecture in the space is defined by a corresponding set of decision values that includes a respective decision value for each of a first plurality of categorical decisions, wherein each candidate hardware architecture in the space is defined by a corresponding set of decision values that includes a respective decision value for each of a second plurality of categorical decisions, and wherein the selecting comprises: jointly updating (i) a set of controller parameters that define, for each of the first and second plurality of categorical decisions, a respective probability distribution over decision values for the categorical decision and (ii) a shared set of parameters, wherein: updating the set of controller policy parameters comprises updating the set of controller parameters through reinforcement learning to maximize a reward function that measures (i) an estimated quality of a candidate hardware architecture and (ii) an estimated quality a candidate network architecture defined by sets of decision values sampled from probability distributions generated using the controller policy parameters, and updating the shared set of model parameters comprises updating the shared set of model parameters to optimize an objective function that measures a performance on the particular machine learning task of the candidate network architectures defined by the sets of decision values sampled from the probability distributions generated using the controller policy; after the joint updating, selecting as the network architecture for the neural network, a candidate network architecture that is defined by respective particular decision values for each of the first plurality of categorical decisions; and selecting as the hardware architecture for the hardware accelerator, a candidate hardware architecture that is defined by respective particular decision values for each of the second plurality of categorical decisions.

The method may further comprise receiving data specifying a target latency for performing the particular machine learning task by the neural network when being deployed on the hardware accelerator.

The reward function may include a quality term that measures the (i) the estimated quality of the candidate hardware architecture and (ii) the estimated quality of the candidate network architecture, and a latency term that is based on a ratio between an estimated latency of the candidate architecture and the target latency.

The joint updating comprises repeatedly performing operations may comprise: determining, using the validation data, an estimated quality on the particular machine learning task of a neural network having a candidate architecture that has a subset of the shared set of model parameters that is defined by the selected decision values for the first plurality of categorical decisions, wherein the quality is estimated in accordance with current values of the subset of the shared set of model parameters that is defined by the selected decision values for the first plurality of categorical decisions.

The joint updating may comprise repeatedly performing operations comprising: determining, using the validation data and a latency simulator, an estimated latency when performing the particular machine learning task of the neural network having the candidate network architecture that has the subset of the shared set of model parameters that is defined by the selected decision values for the first plurality of categorical decisions, wherein the neural network is deployed on the hardware architecture having the hardware architecture that has the subset of the shared set of model parameters that is defined by the selected decision values for the second plurality of categorical decisions.

The joint updating may comprise repeatedly performing operations comprising: determining, using an area simulator, an estimated quality of the candidate hardware architecture that has the subset of the shared set of model parameters that is defined by the selected decision values for the second plurality of categorical decisions.

The latency simulator and the area simulator may be each a respective neural network trained on labelled training data generated using an accelerator simulator.

A further innovative aspect of the subject matter described in this specification can be embodied in a machine learning task-specific hardware accelerator having an architecture defined by performing a process comprising the respective operations of any one of the preceding claims.

Other embodiments of this aspect include corresponding computer systems, apparatus, and computer programs recorded on one or more computer storage devices, each configured to perform the actions of the methods. A system of one or more computers can be configured to perform particular operations or actions by virtue of software, firmware, hardware, or any combination thereof installed on the system that in operation may cause the system to perform the actions. One or more computer programs can be configured to perform particular operations or actions by virtue of including instructions that, when executed by data processing apparatus, cause the apparatus to perform the actions.

The subject matter described in this specification can be implemented in particular embodiments so as to realize one or more of the following advantages.

Hardware accelerators are specialized hardware configured to perform specialized computations and are generally more computationally efficient than their general purpose counterparts, but are also generally more expensive, both because of the cost of the hardware and associated energy costs to power and maintain the accelerators. Performing machine learning tasks, e.g., vision tasks, natural language processing tasks, or other tasks that require near-real-time responses to be provided to users, using neural networks deployed on the hardware accelerators requires (i) neural network architectures that are both accurate and computationally efficient to generate inferences for inputs with some target latency and (ii) hardware accelerator architectures that have been customized for the machine learning task.

The described techniques can be used to search for neural network architectures for neural networks that can perform the task while simultaneously searching for hardware accelerator architectures that can supply sufficient computational resources (e.g., memory, computing power, or both) to support the network performance on the task while satisfying hardware constraints (e.g., resource consumption constraints, area constraints, or both) and to therefore identify both (i) a single architecture or a range of architectures for neural networks that can be deployed effectively to compute inferences with a target latency and (ii) a single architecture or a range of architectures for hardware accelerators on which the neural networks having the identified network architecture are to be deployed that can effectively support network performances on the task while satisfying hardware architecture constraints.

Moreover, because the described techniques allow the system to identify a network architecture jointly with a hardware architecture, the search process consumes many fewer computational resources than existing techniques that search for an architecture for a neural network or a hardware accelerator on an independent (or alternating) basis.

The details of one or more implementations of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
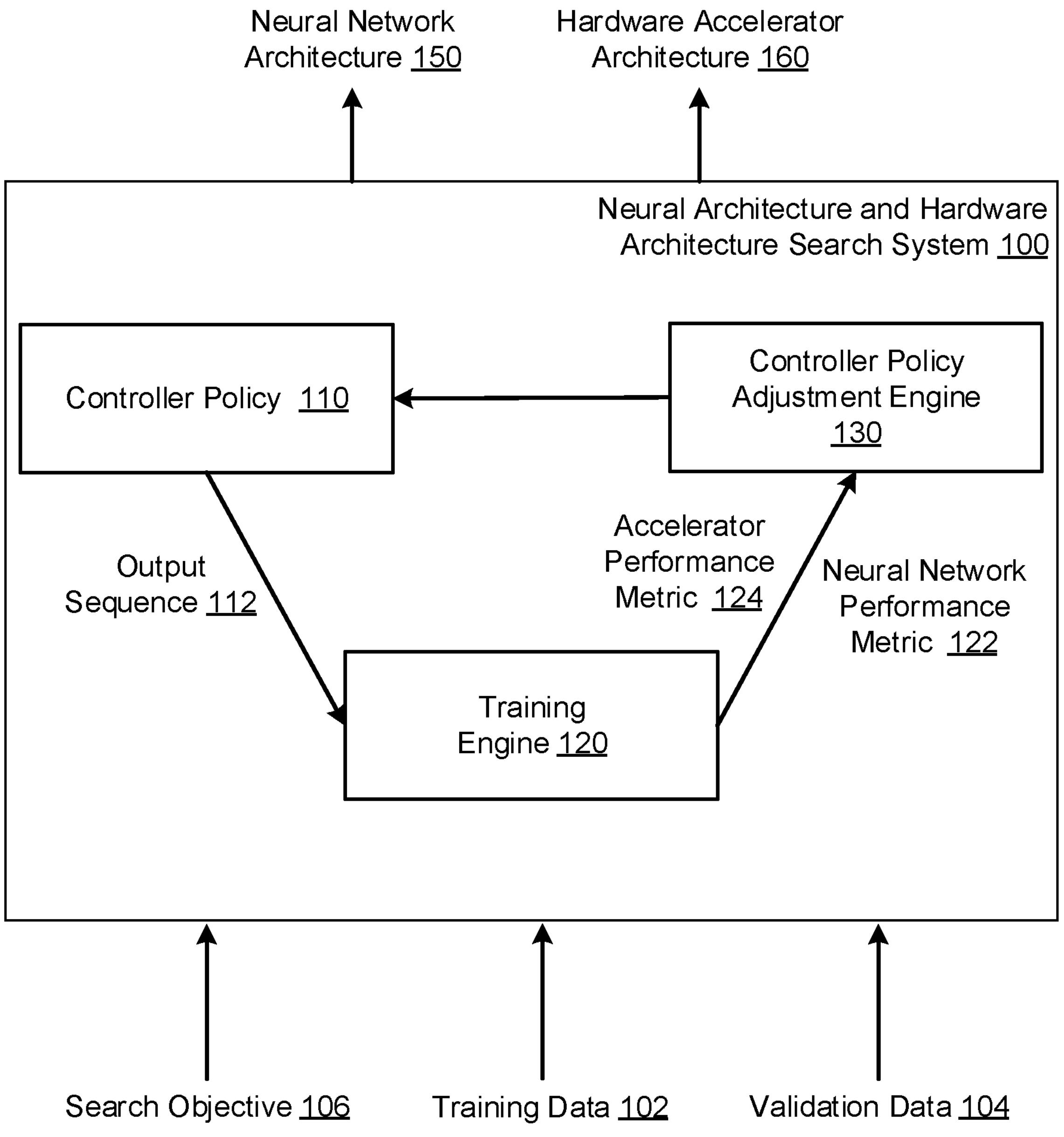
FIG. 1 shows an example neural architecture and hardware architecture search system.

This specification describes a system implemented as computer programs on one or more computers in one or more locations that can jointly (e.g., simultaneously) determine (i) an optimal network architecture for a neural network configured to perform a particular machine learning task and (ii) an optimal hardware architecture for a hardware accelerator that is (part of) a target computing device on which the neural network is to be implemented, i.e., an architecture for a hardware accelerator on which the neural network will be deployed after the neural network is trained.

In some cases, the neural network is a neural network that is configured to perform an image processing task, i.e., receive an input image and to process the input image to generate a network output for the input image. In this specification, processing an input image refers to processing the intensity values of the pixels of the image using a neural network. For example, the task may be image classification and the output generated by the neural network for a given image may be scores for each of a set of object categories, with each score representing an estimated likelihood that the image contains an image of an object belonging to the category. As another example, the task can be image embedding generation and the output generated by the neural network can be a numeric embedding of the input image. As yet another example, the task can be object detection and the output generated by the neural network can identify locations in the input image at which particular types of objects are depicted. As yet another example, the task can be image segmentation and the output generated by the neural network can assign each pixel of the input image to a category from a set of categories.

As another example, if the inputs to the neural network are Internet resources (e.g., web pages), documents, or portions of documents or features extracted from Internet resources, documents, or portions of documents, the task can be to classify the resource or document, i.e., the output generated by the neural network for a given Internet resource, document, or portion of a document may be a score for each of a set of topics, with each score representing an estimated likelihood that the Internet resource, document, or document portion is about the topic.

As another example, if the inputs to the neural network are features of an impression context for a particular advertisement, the output generated by the neural network may be a score that represents an estimated likelihood that the particular advertisement will be clicked on.

As another example, if the inputs to the neural network are features of a personalized recommendation for a user, e.g., features characterizing the context for the recommendation, e.g., features characterizing previous actions taken by the user, the output generated by the neural network may be a score for each of a set of content items, with each score representing an estimated likelihood that the user will respond favorably to being recommended the content item.

As another example, if the input to the neural network is a sequence of text in one language, the output generated by the neural network may be a score for each of a set of pieces of text in another language, with each score representing an estimated likelihood that the piece of text in the other language is a proper translation of the input text into the other language.

As another example, the task may be an audio processing task. For example, if the input to the neural network is a sequence representing a spoken utterance, the output generated by the neural network may be a score for each of a set of pieces of text, each score representing an estimated likelihood that the piece of text is the correct transcript for the utterance.

As another example, the task may be a keyword spotting task where, if the input to the neural network is a sequence representing a spoken utterance, the output generated by the neural network can indicate whether a particular word or phrase ("hotword") was spoken in the utterance. As another example, if the input to the neural network is a sequence representing a spoken utterance, the output generated by the neural network can identify the natural language in which the utterance was spoken.

As another example, the task can be a natural language processing or understanding task, e.g., an entailment task, a paraphrase task, a textual similarity task, a sentiment task, a sentence completion task, a grammaticality task, and so on, that operates on a sequence of text in some natural language.

As another example, the task can be a text to speech task, where the input is text in a natural language or features of text in a natural language and the network output is a spectrogram or other data defining audio of the text being spoken in the natural language.

As another example, the task can be a health prediction task, where the input is electronic health record data for a patient and the output is a prediction that is relevant to the future health of the patient, e.g., a predicted treatment that should be prescribed to the patient, the likelihood that an adverse health event will occur to the patient, or a predicted diagnosis for the patient. Physiological data, such as heart rates, blood pressure, blood sugar levels, blood chemistry or the like, may be used as input, with the output being probabilities for one or more health events occurring and/or probabilities of one or more diagnoses. For example, where the input comprises blood sugar measurements (e.g. a sequence of blood glucose readings), the output may comprise the probability of a hypo- or hyperglycemic event occurring. Where the input comprises blood pressure measurements and/or a heart rate, the output may comprise the probability of a cardiac event occurring and/or heart disease being present.

As another example, the task can be an agent control task, where the input is an observation characterizing the state of an environment and the output defines an action to be performed by the agent in response to the observation. The agent can be, e.g., a real-world or simulated robot, a control system for an industrial facility, or a control system that controls a different kind of agent.

As another example, the task can be a genomics task, where the input is a sequence representing a fragment of a DNA sequence or other molecule sequence and the output is either an embedding of the fragment for use in a downstream task, e.g., by making use of an unsupervised learning technique on a data set of DNA sequence fragments, or an output for the downstream task. Examples of downstream tasks include promoter site prediction, methylation analysis, predicting functional effects of non-coding variants, and so on.

In some cases, the machine learning task is a combination of multiple individual machine learning tasks, i.e., the neural network is configured to perform multiple different individual machine learning tasks, e.g., two or more of the machine learning tasks mentioned above. For example, the neural network can be configured to perform multiple individual natural language understanding tasks. Optionally, the network input can include an identifier for the individual natural language understanding task to be performed on the network input. As another example, the neural network can be configured to perform multiple individual image processing or computer vision tasks, i.e., by generating the output for the multiple different individual image processing tasks in parallel by processing a single input image.

FIG. 1 shows an example neural architecture and hardware architecture search system 100. The neural architecture and hardware architecture search system 100 is an example of a system implemented as computer programs on one or more computers in one or more locations, in which the systems, components, and techniques described below can be implemented.

The neural architecture and hardware architecture search system 100 is a system that obtains training data 102 and validation data 104 for a particular machine learning task and selects a network architecture 150 of a neural network as well as a hardware architecture 160 of a hardware accelerator on which the neural network is to be deployed for performing the task using the training data 102 and the validation data 104.

Generally, both the training data 102 and the validation data 104 include a set of neural network inputs (also referred to as training or validation examples) and, for each network input, a respective target output that should be generated by the neural network to perform the particular task. The training data 102 and the validation data 104 can include different sets of neural network inputs, i.e., so that the validation data 104 can be used to effectively measure how well a neural network that has been trained on the training data 102 performs on new inputs.

The system 100 can receive the training data 102 and the validation data 104 in any of a variety of ways. For example, the system 100 can receive training data as an upload from a remote user of the system over a data communication network, e.g., using an application programming interface (API) made available by the system 100. The system 100 can then randomly divide the received training data into the training data 102 and the validation data 104. As another example, the system 100 can receive an input from a user specifying which data that is already maintained by the system 100 should be used for training the neural network.

The system 100 also receives, e.g., from a user, data specifying one or more search objectives 106 that generally define a desired performance requirement or constraint for the neural network, the hardware accelerator, or both. A few example search objectives are described next.

For example, the search objectives can include a target accuracy for performing the machine learning task. The target accuracy can be evaluated, for example, by computing a loss of the trained neural network on the validation data set or the result of some other measure of model accuracy when computed over the validation data set.

As another example, the search objectives can include a target latency for performing the machine learning task after training and during inference, i.e., for processing new inputs for the particular task after the architecture has been determined. Generally, the target latency is a target latency for the neural network when deployed on a target computing device. The target latency measures the time, e.g., in milliseconds, required to perform inference for a batch of one or more examples, i.e., to process each example in the batch using the neural network, when the neural network is deployed on the target computing device.

As yet another example, the search objectives can include constraints on the configuration or design of the underlying hardware accelerator that supports the operation of the neural network. Example hardware configuration or design constraints can include the area of the hardware accelerator, the power (or energy) consumption of the hardware accelerator, and the like.

Such search objectives may, in some implementations, be represented symbolically as:

$$\min_{\alpha,h} \mathcal{L}(\alpha, h, w_\alpha^*, \mathbb{D}_{val}) \text{ s.t. } w_\alpha^* = \underset{w_\alpha}{\operatorname{argmin}} \mathcal{L}(\alpha, h, w_\alpha, \mathbb{D}_{train})$$

$$\text{Latency}(\alpha, h) \le T_{latency}, \text{Area}(h) \le T_{area}$$

Where $\mathcal{L}$ indicates the objective function for the task and $w_\alpha$ denotes the weights of the architecture $\alpha$. Hardware parameters are denoted h, and the training and evaluation sets denoted $\mathbb{D}_{train}$ and $\mathbb{D}_{val}$ respectively. $T_{latency}$ is the target runtime latency of the trained neural network on performing the task, and $T_{area}$ is the target hardware accelerator area, both of which may be specified in the search objective data.

Thus, using the techniques described below, the system 100 can effectively determine (i) an architecture for a neural network configured to perform a machine learning task and (ii) a hardware architecture for a hardware accelerator on which the neural network is to be deployed, while satisfying the one or more search objectives.

As a concrete example, the system 100 can determine a particular architecture for a neural network that, when deployed on a particular hardware accelerator that has an architecture determined by the system and that has an area no greater than the maximum allowable hardware area, can be configured to perform a particular machine learning task with an acceptable accuracy, e.g., with an accuracy that is approximately equal to the target accuracy, while having a runtime latency that is no greater than the maximum allowable latency. In this example, the maximum allowable hardware area, the target accuracy, and the maximum allowable latency can all be specified in the search objective data 106.

The system 100 then uses the training set 102, the validation data 104, and the search objective data 106 to determine a neural network architecture and a hardware accelerator architecture by searching through a joint search space that is composed of a space of candidate neural network architectures and a space of candidate hardware accelerator architectures.

An architecture for a neural network generally defines the number of layers in the neural network, the operations performed by each of the layers, and the connectivity between the layers in the neural network, i.e., which layers receive inputs from which other layers in the neural network.

In particular, the search space of candidate neural network architectures can be defined by possible values of a set of hyperparameters, i.e., can include a set of hyperparameters, each of which may have a predetermined set of possible values. A selected value of a hyperparameter can be set prior to the commencement of the training of the neural network and can impact the operations performed by the neural network. Collectively, the selected values of the hyperparameters can define an architecture for the neural network.

Some examples of neural architecture search spaces and the corresponding sets of hyperparameters that define these search spaces are described next.

For example, a search space can be built specifically for mobile edge processors and based on a base architecture MobilenetV2 that includes a stack of inverted bottleneck layers. The neural architecture search space in this example can include efficient neural network components such as mobile inverted bottleneck convolution (MBConv) layers, each of which in turn includes one or more inverted residual layers, one or more linear bottleneck layers, and one or more convolution layers, e.g., one or more depthwise separable convolution layers. The searchable hyperparameters can then include respective hyperparameters associated with a depthwise separable convolution layer, an inverted residual layer, or a linear bottleneck layer. Specifically, the searchable hyperparameters can include the kernel size and the expansion ratio for each inverted bottleneck convolution layer. For example, the value of the kernel size can be selected from a set of possible integer values {3, 5, 7}, and the expansion ratio can be selected from a set of possible integer values {1, 3, 6}. The MobilenetV2 search space is described in more detail in Sandler, M., et al. "*MobileNetV2: Inverted Residuals and Linear Bottlenecks.*" arXiv preprint arXiv:1801.04381 (2019), the entire content of which is hereby incorporated herein in their entirety.

As another example, a search space can be built based on a standard EfficientNet-B0 base architecture that includes a stack of inverted residual blocks. An EfficientNet search space may be built with greater cardinality than the MobilenetV2 search space so as to better leverage modern edge accelerators which typically have larger numbers of compute units and memory capacities. Similarly, the searchable hyperparameters in the EfficientNet-B0 search space can include the kernel size and the expansion ratio for each residual block. The EfficientNet search space is described in more detail in Tan, M., et al. "*EfficientNet: Rethinking Model Scaling for Convolutional Neural Networks.*" arXiv preprint arXiv: 1905.11946 (2019), the entire content of which is hereby incorporated herein in their entirety.

The search space of candidate hardware accelerator architectures can be defined by possible values of a set of searchable hardware parameters. Example hardware parameters can include the number of compute units, the amount of parallelism, the compute to memory ratio, the bandwidth, and the like, that are associated with a given hardware accelerator, e.g., an industry-standard, highly parameterized edge accelerator, which collectively specify the hardware architecture including corresponding compute characteristics of the hardware accelerator. Each hardware parameter is typically associated with one or more values, e.g., integer or floating point values, that can be selected from a set of possible values for the hardware parameter.

An example of hardware search spaces and the corresponding sets of hardware parameters that define these search spaces are described below in Table 1.

Table 1 below shows an example candidate architecture design space, where "PE" refers to a processing element that is capable of performing matrix multiplications in a single instruction multiple data (SIMD) paradigm, e.g., with "PEs_in_x_dimension" referring to the number of processing elements along a horizontal dimension of the hardware accelerator. Generally, the number of PEs in each dimension can define the aspect ratio of the hardware accelerator. In each PE there can be multiple compute lanes that share a local memory and each lane can have a register file and a series of SIMD style multiply-accumulate (MAC) compute units.

In particular, in this example, the searchable hardware parameters can include one or more of: a bandwidth of the hardware accelerator, a number of processing elements included in the hardware accelerator, a layout of the processing elements on the hardware accelerator, a number of single-instruction multiple-data (SIMD) style multiply-accumulate (MAC) in each processing element, a number of compute lanes in each processing element, a size of a shared memory in each processing element, or a size of a register file in each processing element.

While a total of three example search spaces (two for neural network architecture and one for hardware accelerator architecture) have now been described, it should be understood that the described techniques can be used to search any search space that is defined by possible values of a set of hyperparameters or parameters or other tunable variables. For example, different neural network architecture search spaces can have layers that are made up of different kinds of operations, e.g., different kinds of residual blocks or different kinds of convolutional operations, e.g., dilated convolutions, spatial convolutions, and so on. Similarly, different hardware accelerator architecture search spaces can have hardware components that carry out different operations or supply different resources, e.g., different kinds of memories, e.g., PE memory, core memory, parameter memory, and so on.

In some implementations, each candidate neural network architecture in the joint search space has a different subset of a shared set of parameters, and the respective values of the shared set of parameters are jointly updated by the system during the search process. This can improve search efficiency and thereby save computing resources (e.g., in terms of processing cycles) that are required to determine the final neural network architecture and the final hardware accelerator architecture.

Specifically, in these implementations, each candidate neural network architecture performs a set of operations that use a different subset of the shared set of model parameters. The subset that each candidate neural network architecture has is defined by a corresponding set of decision values that includes a respective decision value for each of a first plurality of categorical decisions. In other words, the decision values for the first categorical decisions specify which operations are performed by the candidate neural network architecture and, accordingly, which model parameters from the shared set are used by the neural network architecture.

For example, the possible values for the first categorical decisions define one or more of the aspects of the architecture of the neural network, with any aspects that are not defined by the first categorical decisions being fixed, i.e., the same for all of the architectures in the space of candidate neural network architectures. The first categorical decisions can include multiple different types of categorical decisions that each correspond to a respective point in a neural network.

As one example, the first categorical decisions can include binary decisions that determine whether a corresponding layer (or other operation) in the neural network is

TABLE 1

| parameters | type | search space | parameters | type | search space |
|---|---|---|---|---|---|
| PEs_in_x_dimension | int | 1, 2, 4, 6, 8 | local_memory_MB | int | 0.5, 1, 2, 3, 4 |
| PEs_in_y_dimension | int | 1, 2, 4, 6, 8 | compute_lanes | int | 1, 2, 4, 8 |
| SIMD_units | int | 16, 32, 64, 128 | io_bandwidth_gbps | float | 5, 10, 15, 20, 25 |
| register_file_KB | int | 8, 16, 32, 64, 128 | | | |

skipped or is included in the neural network architecture. As another example, the first categorical decisions can include decisions that specify which operation(s) from a corresponding set of operations are performed at a given point in the neural network. For example, a first categorical decision can specify whether a given layer in the architecture is a convolutional layer, an inverted bottleneck layer, and so on. As another example, a first categorical decision can specify which of a set of different convolutions are performed, e.g., by specifying spatial size of the filters of a convolutional layer in the convolutional neural network.

In some implementations, each candidate hardware accelerator architecture has a set of hardware characteristics that are defined by a set of hardware parameters. The set of hardware parameters that each candidate hardware accelerator architecture has is defined by a corresponding set of decision values that includes a respective decision value for each of a second plurality of categorical decisions. In other words, the decision values for the hardware accelerator categorical decisions specify which hardware characteristics the candidate hardware accelerator architecture should have.

For example, the possible values for the second categorical decisions define one or more of the aspects of the hardware characteristics of the hardware accelerator.

The neural architecture and hardware architecture search system 100 determines neural network architecture 150 and the hardware accelerator architecture 160 by automatically searching through the joint search space by using a controller policy 110, a training engine 120, and a controller policy adjustment engine 130.

The controller policy 110 is generally implemented as software that is configurable to generate policy outputs including values of a set of hyperparameters that collectively define a possible architecture for the neural network and values of a set of hardware parameters that collectively define a possible architecture for the hardware accelerator. For example, the software has adjustable settings for generating different values for different hyperparameters or hardware parameters.

In some implementations, the controller policy 110 can be implemented as a neural network, referred to below as a "controller neural network." The controller neural network is a neural network that has parameters, referred to in this specification as "controller network parameters," and that is configured to generate output sequences 112 in accordance with the controller network parameters. Each output sequence 112 generated by the controller neural network defines a respective possible architecture for a candidate neural network (referred to below as a "child neural network") and a respective possible architecture for a candidate hardware accelerator.

In some of these implementations, each output sequence 112 includes a respective output at each of multiple time steps and each time step in the output sequence corresponds to a different hyperparameter of the architecture of the child neural network, or a different hardware parameter of the architecture of the hardware accelerator. Thus, each output sequence 112 includes, at each time step, a respective value of the corresponding hyperparameter or a respective value of the corresponding hardware parameter. Collectively, the values of the hyperparameters in a given output sequence define an architecture for the child neural network, while the values of the hardware parameters in the given output sequence define an architecture of the hardware accelerator.

Alternatively, in some other implementations, the controller policy can include a set of controller policy parameters that define, for each hyperparameter of the neural network architecture (or hardware parameter of the hardware accelerator architecture), a respective probability distribution over possible values of the hyperparameter (or hardware parameter). The system 100 can then use the controller policy parameters to select the candidate neural network architectures and the candidate hardware accelerator architectures. In some of these implementations, each output sequence 112 can include respective values of the hyperparameters and the hardware parameters that are sampled by the system 100 from the possible values in accordance with the probability distributions.

In yet other implementations, the controller policy 110 can include a set of controller policy parameters that define a respective probability distribution for each of the first and second pluralities of categorical decisions, and the system 100 can use the controller policy parameters to select the candidate neural network architectures and the candidate hardware accelerator architectures. That is, in these implementations, the candidate neural network architectures and the candidate hardware accelerator architectures are defined by the sets of decision values sampled from probability distributions generated using the controller policy parameters. In some of these implementations, each output sequence 112 instead includes the sets of decision values for each of the first and second pluralities of categorical decisions.

During the search process, the system 100 determines the architecture for the child neural network and the architecture for the hardware accelerator by using the controller policy adjustment engine 130 to repeatedly adjust the controller policy 110 so that the controller policy 110 can propose neural network architectures and hardware accelerator architectures that satisfy the one or more search objectives 106.

In some implementations where the controller policy 110 is implemented as the controller neural network, the system can use do this by adjusting the values of the controller network parameters. In particular, during an iteration of the training procedure, the system 100 generates a batch of sequences 112 using the controller neural network in accordance with current values of the controller network parameters. For each output sequence 112 in the batch, the training engine 120 trains an instance of the child neural network that has the architecture defined by the output sequence on the training data 102 and evaluates the performance of the trained instance on the validation set 104. For each output sequence 112 in the batch, the system 100 also evaluates the performance of the hardware accelerator on supporting the operation of the child neural network, for example by using appropriate computer architecture simulation tools or techniques. The controller policy adjustment engine 130 then uses the results of the evaluations, i.e., the neural network performance metric 122 and the accelerator performance metric 124, for the output sequences 112 in the batch to update the current values of the controller network parameters to improve the expected performance of the neural network architectures and the hardware accelerator architectures defined by the output sequences generated by the controller neural network on the task.

Alternatively, in some other implementations where the controller policy 110 includes a set of controller policy parameters that define a respective distribution over possible values of each hyperparameter of the candidate neural network and each hardware parameter of the candidate hardware accelerator (or that define a respective probability distribution for each of the first and second pluralities of categorical decisions), the controller policy adjustment engine 130 can update the controller policy 110 through reinforcement learning to maximize a reward function that depends on the neural network performance metric 122 and the accelerator performance metric 124 of the candidate neural network architectures and the candidate hardware accelerator architectures, respectively, defined by the respective values of the hyperparameter and the hardware parameters (or the sets of decision values) sampled from probability distributions generated using the controller policy parameters. In some of these implementations, the training engine 120 jointly updates the shared set of model parameters to optimize an objective function that measures a performance on the particular machine learning task of the candidate neural network architectures.

By repeatedly updating the controller policy 110, the system 100 can encourage the controller policy 110 to generate output sequences that result in child neural networks that have increased neural network performance on the particular task when deployed on hardware accelerators with increased hardware accelerator performance, e.g., to maximize the expected accuracy on the validation set 104 of the neural networks that have the neural network architectures proposed by the controller policy 110, while simultaneously minimizing the runtime latency of the neural networks and minimizing the area of the hardware accelerators that have the neural network architectures proposed by the controller policy 110.

Figure 4:
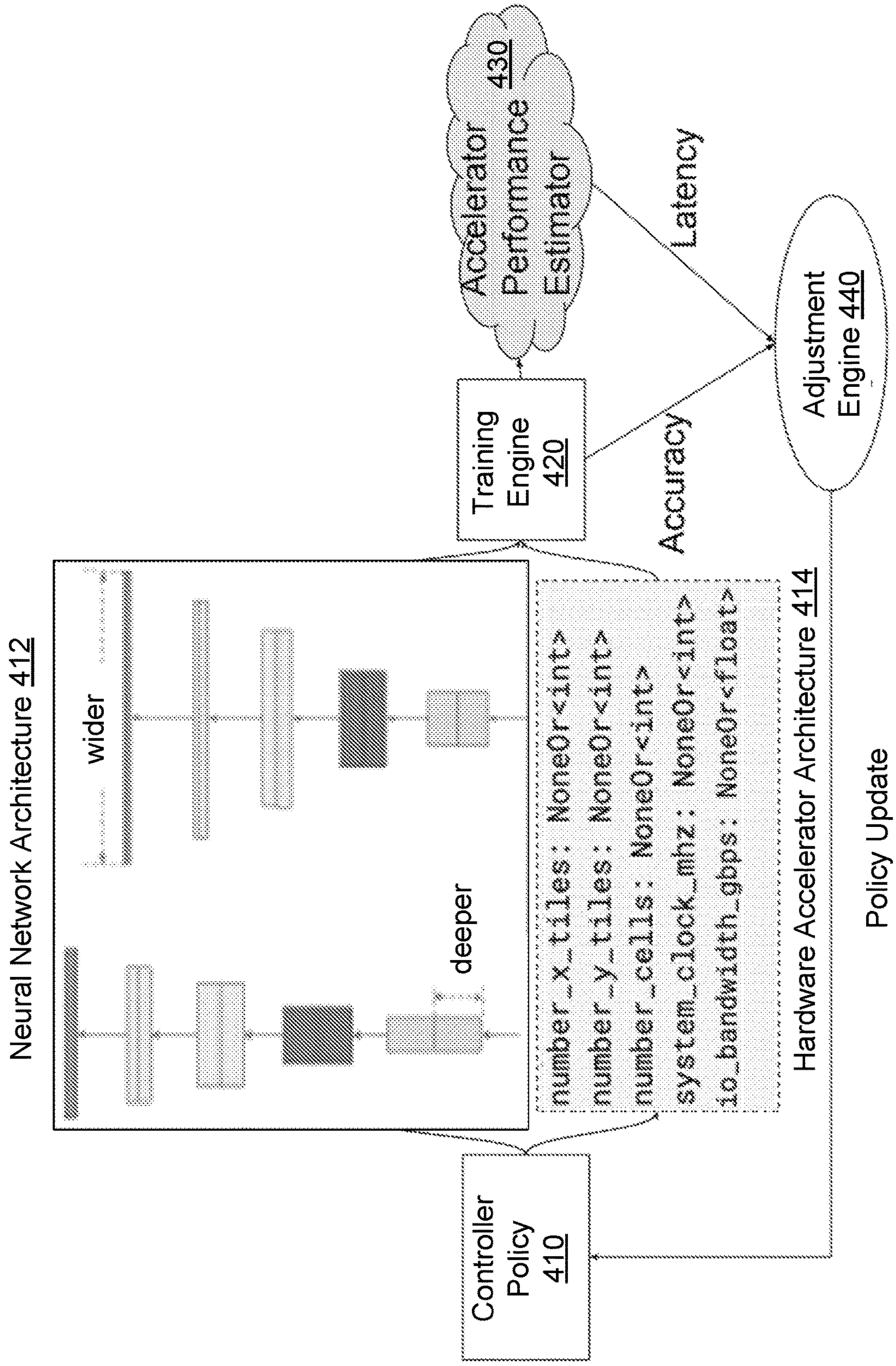
FIG. 4 is an illustration of jointly determining a neural architecture for a neural network and a hardware architecture for a hardware accelerator.

FIG. 4 is an illustration of jointly determining a neural architecture for a neural network and a hardware architecture for a hardware accelerator. Specifically, FIG. 4 illustrates an example of determining a particular architecture for a neural network that, when deployed on a particular hardware accelerator that has an architecture determined by the system, can be configured to perform a particular machine learning task with an acceptable accuracy and acceptable runtime latency.

As illustrated, at each iteration, the controller policy 410 generates policy outputs including values of a set of hyperparameters that collectively define a possible architecture for the neural network 412 and values of a set of hardware parameters that collectively define a possible architecture for the hardware accelerator 414. The training engine 420 trains an instance of the child neural network that has the architecture 412 defined by the policy outputs on the training data and evaluates the performance of the trained instance on the validation set. The accelerator performance estimator 430 simulates an instance of the hardware accelerator to simulate the effect of deploying the child neural network on the hardware accelerator to determine the estimated latency. The controller policy adjustment engine 440 then uses the results of the evaluations, i.e., the accuracy and the latency, to update the controller policy 410 to improve the performance of the new neural network architectures and the new hardware accelerator architectures defined by the policy output generated by the controller policy 410 in the next iteration.

After the controller policy 110 has been updated, e.g., once the controller neural network has been trained, the system 100 can select the neural network architecture and the hardware accelerator architecture that best satisfy the search objectives 106 as the final architecture of the child neural network and the final architecture of the hardware accelerator, respectively. Instead or in addition, the system 100 can generate a new output sequence by using the updated controller policy 110, e.g., in accordance with the trained values of the controller network parameters, and use the neural network architecture and the hardware accelerator architecture defined by the new output sequence as the final architecture of the child neural network and the final architecture of the hardware accelerator, respectively.

The neural architecture and hardware architecture search system 100 can then generate as output (i) neural network architecture data 150 that specifies the architecture of the child neural network, e.g., data specifying the layers that are part of the child neural network, the connectivity between the layers, and the operations performed by the layers, and (ii) hardware accelerator architecture data 160 that specifies the architecture of the hardware accelerator, e.g., data specifying the layout of the processing elements on the hardware accelerator, the number of compute lanes, and the size of the local memory.

For example, the neural network and hardware architecture search system 100 can output the neural network architecture data 150 and the hardware accelerator architecture data 160 to the user that provided the search objectives 106. As another example, the system 100 can output the hardware accelerator architecture data, e.g., by a wired or wireless network, to a semiconductor fabrication facility that houses semiconductor fabrication equipment that can be used to fabricate the hardware accelerators that have the final hardware architecture. In some cases, the output data also includes trained values of the parameters of the child neural network from the training of the trained instance of the child neural network that had the architecture.

In some implementations, instead of or in addition to outputting the neural network architecture data 150 and the hardware accelerator architecture data 160, the system 100 trains an instance of the neural network having the determined architecture, e.g., either from scratch or to fine-tune the parameter values generated as a result of training the instance of the child neural network having the architecture, and then uses the trained neural network to process requests received by users, e.g., through the API provided by the system. That is, the system 100 can receive inputs to be processed, use the trained child neural network to process the inputs, and provide the outputs generated by the trained neural network or data derived from the generated outputs in response to the received inputs.

In some implementations, the system 100 could be included as part of a software tool for designing and/or analyzing integrated circuits, e.g., an electronic design automation (EDA) tool, and the hardware accelerator architecture data may then be provided to another component of the tool for further refinement or evaluation before the hardware accelerator is fabricated.

In the implementations where the controller policy is implemented as the controller neural network, the system 100 can train the controller neural network in a distributed manner. That is, the system 100 includes multiple replicas of the controller neural network. In some of these implementations where the training is distributed, each replica has a dedicated training engine that generates performance metrics for batches of output sequences output by the replica and a dedicated controller policy adjustment engine that determines updates to the controller network parameters using the performance metrics. Once the controller policy adjustment engine has determined an update, the controller policy adjustment engine can transmit the update to a central policy adjustment server that is accessible to all of the controller policy adjustment engines. The central policy adjustment server can update the values of the controller network parameters that are maintained by the server and send the updated values to the controller policy adjustment engine. In some cases, each of the multiple replicas and their corresponding training engines and policy adjustment engines can operate asynchronously from each other set of training engines and policy adjustment engines.

Figure 2:
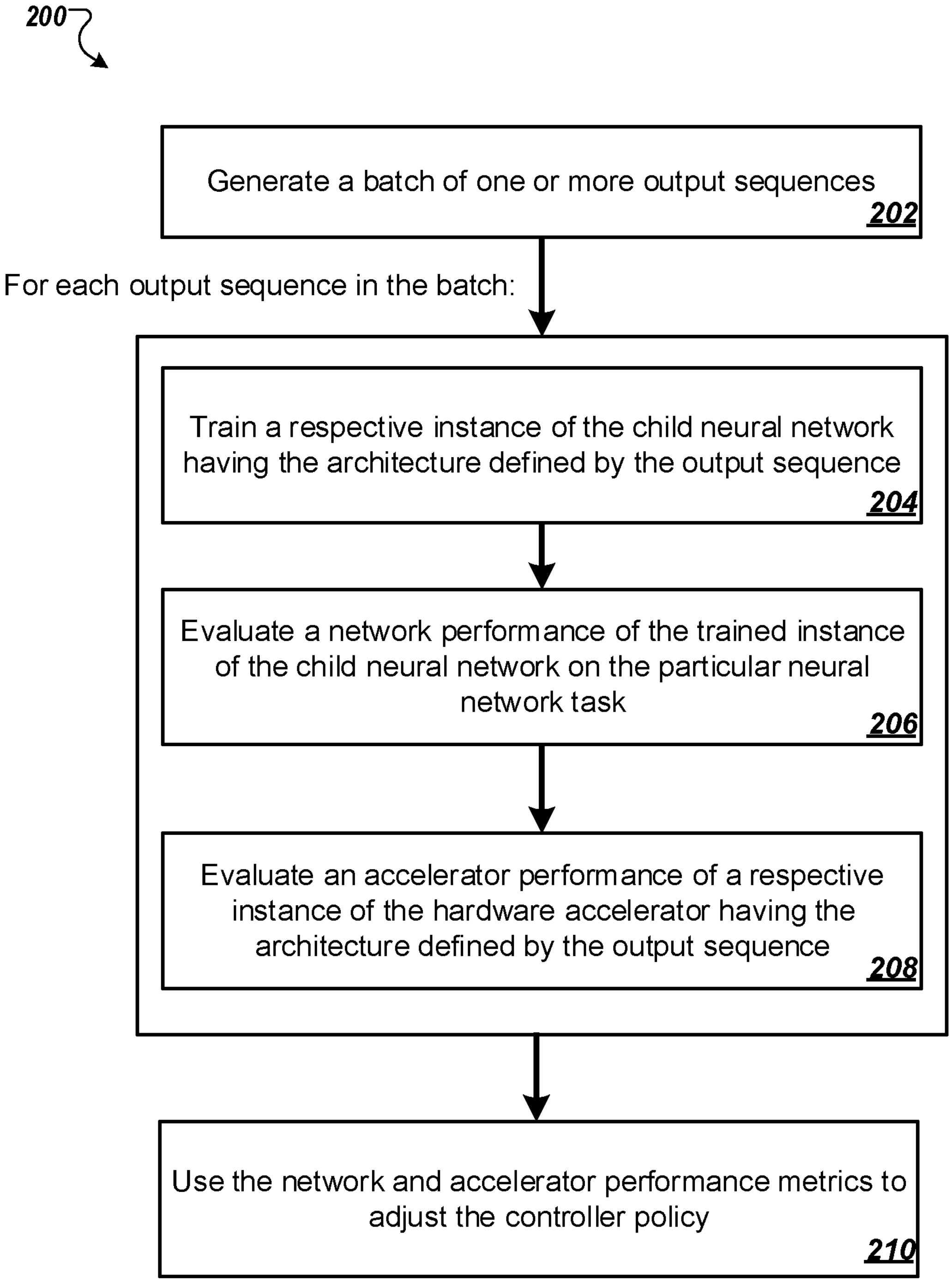
FIG. 2 is a flow diagram of an example process for updating a controller policy.

FIG. 2 is a flow diagram of an example process 200 for updating a controller policy. For convenience, the process 200 will be described as being performed by a system of one or more computers located in one or more locations. For example, a system, e.g., the neural architecture and hardware architecture search system 100 of FIG. 1, appropriately programmed, can perform the process 200.

The system can repeatedly perform the process 200 to iteratively determine updates to the controller policy.

The system generates, using a controller policy, a batch of one or more output sequences (step 202). Each output sequence in the batch defines (i) a respective architecture of a child neural network that is configured to perform a particular machine learning task and (ii) a respective architecture of a hardware accelerator on which a trained instance of the child neural network is to be implemented.

Depending on the specifics of the controller policy, the system can generate each output sequence in any of a variety of ways. For example, when generating an output sequence, the system can first generate respective hyperparameter values of the child neural network, followed by respective hardware parameter values of the hardware accelerator. That is, the output sequence can include a value for a respective hyperparameter of the child neural network at each of a first plurality of time steps, and a value for a respective hardware parameter of the hardware accelerator at each of a second plurality of time steps that are subsequent to the last time step in the first plurality of time steps. As another example, the system can first generate the respective hardware parameter values of the hardware accelerator, followed by the respective hyperparameter values of the child neural network. As yet another example, the system can generate the respective hyperparameter values of the child neural network and the respective hardware parameter values of the hardware accelerator in an interleaved manner.

In some implementations, the controller policy can be implemented as a controller neural network. In some such implementations, the neural network can be a recurrent neural network that includes one or more recurrent neural network layers that are configured to, for each time step, receive as input the value of the hyperparameter (or hardware parameter) corresponding to the preceding time step in the given output sequence and to process the input to update a current hidden state of the recurrent neural network. For example, the recurrent layers in the controller neural network can be long-short term memory (LSTM) layers or gated recurrent unit (GRU) layers.

Thus, to generate a hyperparameter (or hardware parameter) value for a given time step in an output sequence, the system provides as input to the controller neural network the value of the hyperparameter (or hardware parameter) at the preceding time step in the output sequence and the controller neural network generates an output for the time step that defines a score distribution over possible values of the hyperparameter (or hardware parameter) at the time step. The system can generate the score distribution by using an output layer of the controller neural network, which may be configured as a softmax layer. For the very first time step in the output sequence, because there is no preceding time step, the system can instead provide a predetermined placeholder input. The system then samples from the possible values in accordance with the score distribution to determine the value of the hyperparameter (or hardware parameter) at the time step in the output sequence. The possible values that a given hyperparameter (or hardware parameter) can take are fixed prior to training and the number of possible values can be different for different hyperparameters (or hardware parameters).

In the cases where the batch includes more than one output sequence, e.g., eight, sixteen, thirty-two, or sixty-four sequences, because the system samples from a score distribution when generating each hyperparameter (or hardware parameter) value in an output sequence, the sequences in the batch will generally be different even though they are each generated in accordance with the same controller parameter values.

In some other implementations, instead of being configured as a neural network, the controller policy can include a set of controller policy parameters that define, for each hyperparameter of the neural network architecture (or hardware parameter of the hardware accelerator architecture), a respective probability distribution over possible values of the hyperparameter (or hardware parameter). To generate the batch of one or more output sequences that each defines (i) a respective architecture of a child neural network and (ii) a respective architecture of a hardware accelerator, the system then repeatedly samples from the possible values in accordance with the probability distributions to determine the respective values of the hyperparameters (or hardware parameters) to be included in the output sequence.

For each output sequence in the batch, the system trains a respective instance of the child neural network having the architecture defined by the output sequence to perform the particular machine learning task (step 204). That is, for each output sequence in the batch, the system instantiates a neural network having the architecture defined by the output sequence and trains the instance on the received training data to perform the particular machine learning task using a conventional machine learning training technique that is appropriate for the task, e.g., stochastic gradient descent with backpropagation or backpropagation-through-time. In some implementations, the system parallelizes the training of the child neural networks to decrease the overall training time for the controller neural network. The system can train each child neural network for a specified amount of time or a specified number of training iterations.

For each output sequence in the batch, the system evaluates a network performance of the trained instance of the child neural network on the particular machine learning task to determine a network performance metric for the trained instance of the child neural network on the particular machine learning task (step 206). For example, the performance metric can be an accuracy of the trained instance on the validation set as measured by an appropriate accuracy measure. For example, the accuracy can be a perplexity measure when the outputs are sequences or a cross-entropy error rate when the task is a classification task. As another example, the performance metric can be an average or a maximum of the accuracies of the instance for each of the last two, five, or ten epochs of the training of the instance.

For each output sequence in the batch, in addition, the system evaluates an accelerator performance of a respective instance of the hardware accelerator having the architecture defined by the output sequence to determine an accelerator performance metric for the instance of the hardware accelerator (step 208). The performance metric measures the performance of an instance of the hardware accelerator on supporting the operation of the trained instance of the child neural network that has the architecture defined by the output sequence on the particular machine learning task.

In some implementations, to evaluate the hardware accelerator performance, various tools suitable for evaluating the hardware design alternatives may be used. One example of such tools is a cycle-accurate performance simulator. The system can use the cycle-accurate performance simulator to determine an estimated latency, e.g., in milliseconds, of the neural network on performing the particular machine learning task when being deployed on the (simulated) instance of hardware accelerator, e.g., together with simulation data that specifies (i) the respective architecture of the child neural network and (ii) the respective architecture of the hardware accelerator defined by the output sequence.

Another example of such tools is an analytical area estimator. The system can use the analytical area estimator to determine an estimated area, e.g., in square millimeters, of the instance of the hardware accelerator, e.g., together with simulation data that specifies the respective architecture of the hardware accelerator defined by the batch of output sequences.

In some other implementations, various machine learning-based techniques may instead be used to determine the accelerator performance metric. Unlike the costly simulator which typically takes as long as one hour, or more, merely to evaluate the performance of a single hardware accelerator with a proposed hardware architecture, machine learning-based techniques such as neural networks are typically much faster and more resource-efficient when used to determine the performance metrics.

For example, the system can use a neural network, e.g., a feedforward neural network, that is configured to receive as input data that specifies the respective architecture of the hardware accelerator and, in some cases, data that specifies the respective architecture of the child neural network and to process the input in accordance with current values of the parameters of the neural network to generate as output a prediction for the area of the hardware accelerator. As another example, the system can use another neural network to generate a prediction for the model accuracy of the neural network, or a prediction for the latency of the neural network deployed on the hardware accelerator. To ensure that the neural network can effectively predict the performance metrics, the neural network may be trained by using supervised training techniques on labelled training data generated by using the aforementioned simulators.

The system uses (i) the network performance metrics for the trained instances of the child neural network and (ii) the accelerator performance metrics for the instances of the hardware accelerators to adjust the controller policy (step 210).

In general, the system adjusts the controller policy in a way that can encourage the controller policy to generate output sequences that result in child neural networks and the hardware accelerator architectures both having increased performance metrics. In some cases, however, depending on the actual progress of the joint search in view of the search objectives, the system may adjust the instant focus of the joint search, for example by fixing the network performance metric for the trained instance of the child neural network on the particular neural network task and uses only the determined accelerator performance metrics for the instances of the hardware accelerators to adjust the controller policy.

In some implementations where the controller policy is implemented as the controller neural network that is configured as a recurrent neural network, the system adjusts the current controller parameter values by training the controller neural network using a reinforcement learning technique. More specifically, the system trains the controller neural network to generate output sequences that maximize a received reward that is determined based on the network performance metrics of the trained neural network instances and on the accelerator performance metrics of the hardware accelerators.

In particular, the reward for a given output sequence is a function of the network performance metrics and the accelerator performance metrics. For example, the reward can be computed a combination, e.g., a product, of different reward terms that are dependent on the neural network accuracy, runtime latency, and hardware accelerator area, respectively. That is, the system trains the controller neural network to generate output sequences that maximize:

$$\max_{\alpha,h} \text{Accuracy}(\alpha, h) \times \left[\frac{\text{Latency}(\alpha, h)}{T_{latency}}\right]^{w_0} \times \left[\frac{\text{Area}(h)}{T_{area}}\right]^{w_1},$$

where $w_0$, $w_1$ are the weight factors:

$$w_0 = \begin{cases} p, & \text{if Latency}(\alpha, h) \le T_{latency} \\ q, & \text{otherwise} \end{cases} \quad w_1 = \begin{cases} p, & \text{if Area } (h) \le T_{area} \\ q, & \text{otherwise} \end{cases}$$

and where α are hyperparameters that define the neural network architectures, and h are hardware parameters that define the hardware accelerator architectures, $T_{latency}$ is the target runtime latency of the trained child neural network on performing the task, and $T_{area}$ is the target hardware accelerator area, both of which may be specified in the search objective data.

In this example, during search, the system may impose a soft constraint on the latency, the area, or both, e.g., by setting p and q to both have a non-zero value, e.g., −0.071. Instead, to impose a hard constraint, e.g., to impose a hard constraint on latency, the system may set p=0 and q=−1, where the system mostly uses accuracy as the search objective insofar as the estimated latency satisfies (e.g., is no greater than) the target latency and only significantly reduces the reward if the latency constraint is violated.

In some of these implementations, the system trains the controller neural network, i.e., to determine trained values of the controller network parameters from initial values of the controller network parameters, to maximize the expected reward using a policy gradient technique. For example, the policy gradient technique can be a REINFORCE technique or a Proximal Policy Optimization (PPO) technique.

In some other implementations where the controller policy includes a set of controller policy parameters that define, for each hyperparameter of the neural network architecture (or hardware parameter of the hardware accelerator architecture), a respective probability distribution over possible values of the hyperparameter (or hardware parameter), the system can similarly adjust the current values of the set of controller policy parameters by using the policy gradient technique.

Figure 3:
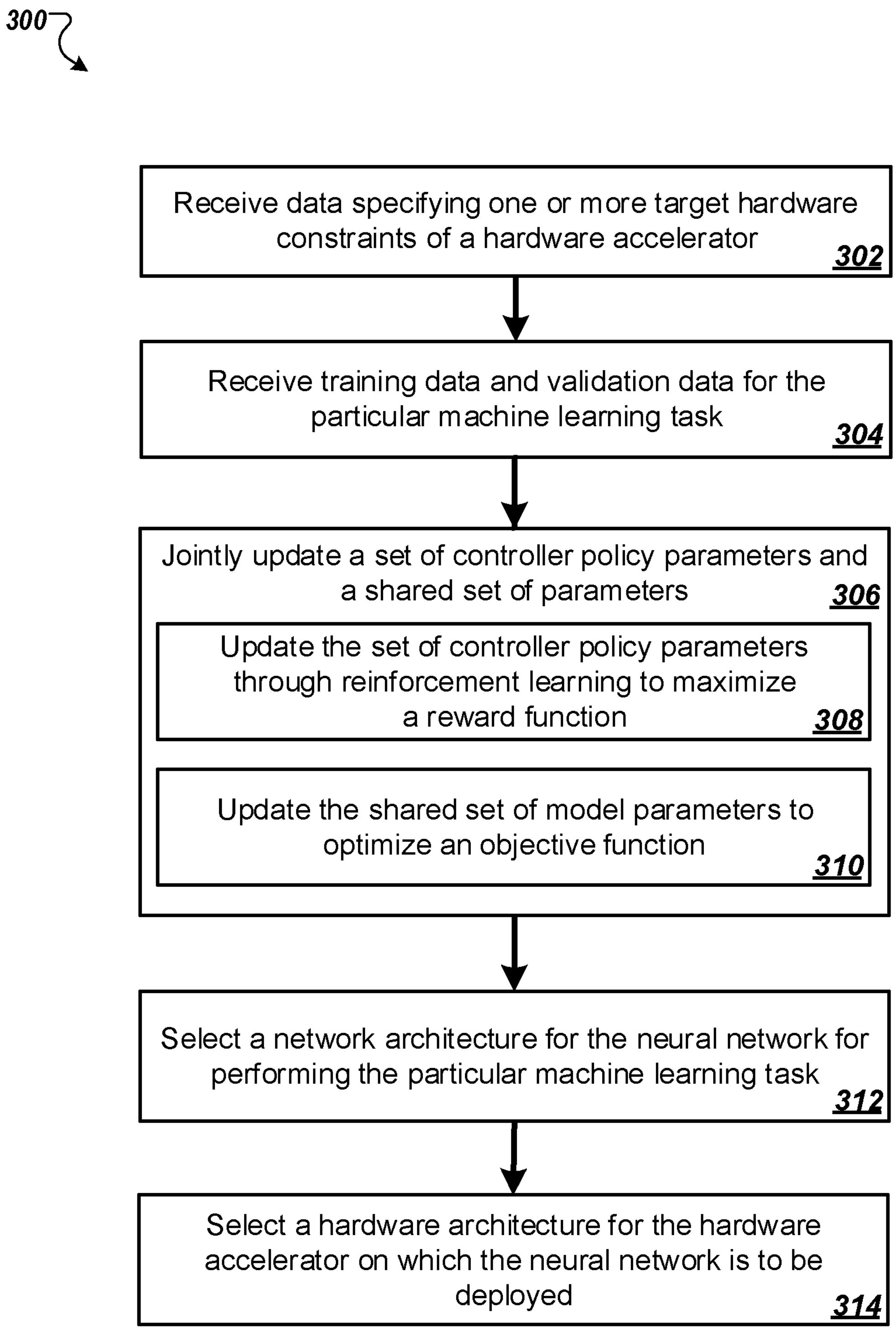
FIG. 3 is a flow diagram of an example process for selecting an architecture for a neural network and an architecture for a hardware accelerator by jointly updating a set of controller policy parameters and a shared set of parameters.

FIG. 3 is a flow diagram of an example process 300 for selecting an architecture for a neural network and an architecture for a hardware accelerator by jointly updating a set of controller policy parameters and a shared set of parameters. For convenience, the process 300 will be described as being performed by a system of one or more computers located in one or more locations. For example, a system, e.g., the neural architecture and hardware architecture search system 100 of FIG. 1, appropriately programmed, can perform the process 300.

The system receives data specifying one or more target hardware constraints of a hardware accelerator on which a neural network for performing a particular machine learning task is to be deployed (step 302). For example, the received data can specify a target area or power consumption of the hardware accelerator. As another example, the received data can specify a target latency for performing the particular machine learning task by the neural network deployed on the hardware accelerator. For example, the target latency can be a measure of the time required to process a single input or a batch of multiple inputs through the trained neural network when deployed on the hardware accelerator.

The system receives training data and validation data for the particular machine learning task (step 304).

The system then performs the followings steps 306-310 to select, from a space of candidate network architectures and using the training data and the validation data, a network architecture for the neural network for performing the particular machine learning task. In addition, the system performs the followings steps 306-310 to select, from a space of candidate hardware architectures, a hardware architecture for the hardware accelerator on which the neural network performing the particular machine learning task is to be deployed.

As described above, both the space of candidate network architectures and the space of candidate hardware architectures may be part of a larger, joint search space. Each candidate neural network architecture in the space is defined by a corresponding set of decision values that includes a respective decision value for each of a first plurality of categorical decisions. Similarly, each candidate hardware accelerator architecture in the space is defined by a corresponding set of decision values that includes a respective decision value for each of a second plurality of categorical decisions.

In the example of FIG. 3, the system uses the controller policy that in turn includes a plurality of controller policy parameters to generate a respective probability distribution for each of the first and second plurality of categorical decisions in accordance with current values of the controller policy parameters. In particular, the controller policy parameters can include, for each categorical decision, a respective parameter for each possible decision value for the decision. The system can generate a probability distribution for a given categorical decision by applying a softmax function to the current values of the respective parameters for each of the possible decision values for the given decision. To select a respective decision value for each of the first and second plurality of categorical decisions, for example, the system can, for each categorical decision, sample a decision value from the probability distribution for the categorical decision.

To select the architectures, the system jointly updates (i) a set of controller policy parameters that define, for each of the first and second plurality of categorical decisions, a respective probability distribution over decision values for the categorical decision and (ii) the shared set of parameters (step 306). In other words, the system repeatedly performs the following steps 308 and 310 in each iteration of joint updating. Each iteration of steps 306-310 can start from the values of the shared set of model parameters that were determined at the preceding iteration.

Generally, during the joint update, the system can update the set of controller policy parameters through reinforcement learning to maximize a reward function of candidate neural network architectures and hardware accelerator architectures that are defined by sets of decision values sampled from probability distributions generated using the controller policy parameters (step 308).

For example, the reward function can include a quality term that measures the (i) the estimated quality of the candidate hardware accelerator architecture and (ii) the estimated quality of the candidate neural network architecture, and a latency (or power consumption) term that is based on a ratio between an estimated latency (or estimated power consumption) of the candidate network architecture and the target latency (or target power consumption).

The system can use the validation data to determine the estimated quality on the particular machine learning task of a neural network having a candidate architecture that has a subset of the shared set of model parameters that is defined by the selected decision values for the first plurality of categorical decisions. In particular, the system determines the estimated quality in accordance with current values of the subset of the shared set of model parameters.

As a particular example, the system can determine the estimated quality to be a quality of the neural network having the candidate architecture on a batch of multiple validation examples from the validation data. That is, the system can process each validation input in the batch using a neural network having the candidate architecture and in accordance with current values of the corresponding subset of the shared set of model parameters to generate a predicted output and then compute, using the target outputs for the validation inputs, an accuracy or other appropriate performance measure for the machine learning task for the predicted outputs.

The system can use appropriate computer architecture simulation tools or techniques such as an area simulator to determine an estimated quality of the candidate hardware architecture that has the subset of the shared set of model parameters that is defined by the selected decision values for the second plurality of categorical decisions.

The system can use the validation data to determine an estimated latency (or power consumption) when performing the particular machine learning task of the neural network having the candidate architecture that has the subset of the shared set of model parameters that is defined by the selected decision values for the categorical decisions.

For example, the system determines latencies for each example in a batch of validation examples when the neural network having the candidate neural network architecture is deployed on the instance of the hardware accelerator having the candidate hardware accelerator architecture. That is, the system can process each validation input in the batch using a neural network having the candidate architecture that is deployed on the instance of the hardware accelerator to generate a predicted output and then measure the latency of processing the batch.

As another example, the system can make use of a computer architecture simulator that simulates the instance of the hardware accelerator having the candidate hardware accelerator architecture to simulate the effect of deploying the neural network on the hardware accelerator to determine the estimated latency or estimated power consumption.

As yet another example, the system can make use a latency simulation neural network and an area simulation neural network to determine the prediction of the latency and area, respectively. The neural networks may be trained on labelled training data generated using the computer architecture simulators.

The system then determines, through reinforcement learning, an update to the controller policy parameters that improves the reward function based on the estimated quality of the candidate hardware accelerator architecture, the estimated quality of the candidate neural network architecture, and the estimated latency. In particular, the system can perform an update step of a policy gradient reinforcement learning algorithm, e.g., the REINFORCE algorithm, on the computed reward, i.e., on the output of the reward function, for the estimated qualities and the estimated latency to determine the update to the controller policy parameters.

During the joint update, the system also updates the shared set of model parameters to optimize an objective function that measures a performance on the particular machine learning task of the candidate neural network architectures defined by the sets of decision values sampled from the probability distributions generated using the controller policy parameters for the first plurality of categorical decisions (step 310).

For example, the system can sample a batch of training examples from the training data and perform a training step on the sampled batch using an appropriate deep learning algorithm, e.g., stochastic gradient descent, to compute a gradient update, i.e., to compute a gradient of the objective function with respect to the subset of model parameters, and then apply the gradient update to the current values of the subset.

After the joint updating, the system selects, as the neural network architecture for the neural network for performing the particular machine learning task, a candidate neural network architecture that is defined by respective particular decision values for each of the first plurality of categorical decisions (step 312).

The system selects, as the hardware accelerator architecture for the hardware accelerator on which the neural network is to be deployed, a candidate hardware accelerator architecture that is defined by respective particular decision values for each of the second plurality of categorical decisions (step 314).

For example, the system can select the candidate neural network or hardware accelerator architecture by, for each of the first or second plurality of categorical decisions, selecting as the particular decision value the decision value having the highest probability in the probability distribution for the categorical decision (or, equivalently, the decision value having the highest corresponding parameter value).

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

In this specification, the term "database" is used broadly to refer to any collection of data: the data does not need to be structured in any particular way, or structured at all, and it can be stored on storage devices in one or more locations. Thus, for example, the index database can include multiple collections of data, each of which may be organized and accessed differently.

Similarly, in this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, .e.g., a TensorFlow framework, a Microsoft Cognitive Toolkit framework, an Apache Singa framework, or an Apache MXNet framework.

Embodiments of the subject matter described in this specification can be implemented in a computing system that includes a back end component, e.g., as a data server, or that includes a middleware component, e.g., an application server, or that includes a front end component, e.g., a client computer having a graphical user interface, a web browser, or an app through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment.

Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a sub combination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method comprising:

generating, using a controller policy, a batch of one or more output sequences, wherein each output sequence in the batch comprises (i) values for hyperparameters of a child neural network that is configured to perform a particular neural network task and (ii) values for hardware parameters of a hardware accelerator on which a trained instance of the child neural network is to be implemented, wherein the values for the hyperparameters of the child neural network define a respective architecture of the child neural network, and wherein the values for the hardware parameters define a respective architecture of the hardware accelerator;

for each output sequence in the batch:

training a respective instance of the child neural network having the architecture defined by the output sequence to perform the particular neural network task;

evaluating a network performance of the trained instance of the child neural network on the particular neural network task to determine a network performance metric for the trained instance of the child neural network on the particular neural network task; and evaluating an accelerator performance of a respective instance of the hardware accelerator having the architecture defined by the output sequence to determine an accelerator performance metric for the instance of the hardware accelerator on supporting a performance of the trained instance of the child neural network having the architecture defined by the output sequence on the particular neural network task, wherein the accelerator performance metric comprises an estimated area of the hardware accelerator, and wherein evaluating the accelerator performance comprises processing, using a first neural network, input data that specifies the respective architecture of the hardware accelerator to generate the estimated area of the hardware accelerator; and using (i) the network performance metrics for the trained instances of the child neural network and (ii) the accelerator performance metrics for the instances of the hardware accelerators to adjust the controller policy.

2. The method of claim 1, wherein:

the controller policy is implemented using a controller neural network having a plurality of controller network parameters; and adjusting the controller policy comprises adjusting current values of the plurality of controller network parameters.

3. The method of claim 2, wherein using (i) the network performance metrics for the trained instances of the child neural network and (ii) the accelerator performance metrics for the instances of the hardware accelerators to adjust the controller policy comprises:

training, using a reinforcement learning technique, the controller neural network to generate output sequences that result in child neural networks having increased network performance metrics and hardware accelerators having increased accelerator performance metrics.

4. The method of claim 3, wherein:

the reinforcement learning technique is a proximal policy optimization (PPO) technique.

5. The method of claim 1, wherein each output sequence comprises a value for a respective hyperparameter of the child neural network at each of a first plurality of time steps.

6. The method of claim 1, wherein each output sequence comprises a value for a respective hardware parameter of the hardware accelerator at each of a second plurality of time steps.

7. The method of claim 2, wherein the controller neural network is a recurrent neural network that comprises:

one or more recurrent neural network layers that are configured to, for a given output sequence and at each time step:

receive as input the value of hyperparameter or hardware parameter at the preceding time step in the given output sequence, and to process the input to update a current hidden state of the recurrent neural network; and a respective output layer for each time step, wherein each output layer is configured to, for the given output sequence:

receive an output layer input comprising the updated hidden state at the time step and to generate an output for the time step that defines a score distribution over possible values of the hyperparameter or hardware parameter at the time step.

8. The method of claim 2, wherein generating, using the controller policy, a batch of one or more output sequences comprises, for each output sequence in the batch and for each of the plurality of time steps:

providing as input to the controller neural network the value of the hyperparameter or hardware parameters at the preceding time step in the output sequence to generate an output for the time step that defines a score distribution over possible values of the hyperparameter or hardware parameter at the time step; and sampling from the possible values in accordance with the score distribution to determine the value of the hyperparameter or hardware parameter at the time step in the output sequence.

9. The method of claim 1, wherein:

the particular neural network task is an object classification and/or detection task, an object pose estimation task, or a semantic segmentation task;

the child neural network is a convolutional neural network that includes one or more depthwise separable convolution layers; and the hyperparameters include hyperparameters for each depthwise separable convolution layers in the child neural network.

10. The method of claim 1, wherein:

the child neural network includes one or more inverted residual layers and one or more linear bottleneck layers; and the hyperparameters include hyperparameters for each inverted residual layers and linear bottleneck layers in the child neural network.

11. The method of claim 1, wherein the hardware parameters of the hardware accelerator comprises one or more of:

a bandwidth of the hardware accelerator, a number of processing elements included in the hardware accelerator, a layout of the processing elements on the hardware accelerator, a number of single-instruction multiple-data (SIMD) style multiply-accumulate (MAC) in each processing element, a number of compute lanes in each processing element, a size of a shared memory in each processing element, or a size of a register file in each processing element.

12. The method of claim 1, wherein the accelerator performance metric for the instance of the hardware accelerator on supporting a performance of the trained instance of the child neural network comprises:

the estimated area of the hardware accelerator, and one or both of an estimated power consumption of the hardware accelerator, or an estimated latency of the neural network on performing the particular neural network task when being deployed on the hardware accelerator.

13. The method of claim 12, wherein evaluating an accelerator performance of a respective instance of the hardware accelerator having the architecture defined by the output sequence to determine an accelerator performance metric for the instance of the hardware accelerator on supporting a performance of the trained instance of the child neural network having the architecture defined by the output sequence on the particular neural network task comprises:

determining, based on using a cycle-accurate performance simulator and from (i) the respective architecture of the child neural network and (ii) the respective architecture of the hardware accelerator defined by the batch of output sequences, the estimated latency of the neural network on performing the particular neural network task when being deployed on the hardware accelerator.

14. The method of claim 12, wherein using (i) the network performance metrics for the trained instances of the child neural network and (ii) the accelerator performance metrics for the instances of the hardware accelerators to adjust the current values of the controller network parameters of the controller neural network comprises:

assigning different weights to the one or more of accelerator performance metrics; and adjusting, according to the different weights, the current values of the controller network parameters of the controller neural network.

15. The method of claim 2, wherein using (i) the network performance metrics for the trained instances of the child neural network and (ii) the accelerator performance metrics for the instances of the hardware accelerators to adjust the controller policy further comprises:

fixing the network performance metric for the trained instance of the child neural network on the particular neural network task and using only the determined accelerator performance metrics for the instances of the hardware accelerators to adjust the current values of the controller network parameters of the controller neural network.

16. The method of claim 1, further comprising:

generating, in accordance with the adjusted values of the controller network parameters, a final output sequence that defines a final architecture of the child neural network.

17. The method of claim 16, further comprising performing the particular neural network task for received network inputs by processing the received network inputs using a child neural network having the final architecture.

18. A method comprising:

receiving data specifying one or more target hardware constraints of a hardware accelerator on which a neural network for performing a particular machine learning task is to be deployed;

receiving training data and validation data for the particular machine learning task; and selecting, from a space of candidate network architectures and using the training data and the validation data, a network architecture for the neural network for performing the particular machine learning task, selecting, from a space of candidate hardware architectures, a hardware architecture for the hardware accelerator on which the neural network performing the particular machine learning task is to be deployed, wherein each candidate network architecture in the space is defined by a corresponding set of decision values that includes a respective decision value for each of a first plurality of categorical decisions, wherein each candidate hardware architecture in the space is defined by a corresponding set of decision values that includes a respective decision value for each of a second plurality of categorical decisions, and wherein the selecting comprises:

jointly updating (i) a set of controller policy parameters that define, for each of the first and second plurality of categorical decisions, a respective probability distribution over decision values for the categorical decision and (ii) a shared set of model parameters shared by the candidate network architectures in the space, wherein each candidate network architecture in the space is configured to perform a set of operations that use a different subset of the shared set of model parameters defined by the respective decision values for the first plurality of categorical decisions, wherein:

updating the set of controller policy parameters comprises updating the set of controller policy parameters through reinforcement learning to maximize a reward function that measures (i) an estimated quality of a candidate hardware architecture and (ii) an estimated quality of a candidate network architecture defined by sets of decision values sampled from probability distributions generated using the set of controller policy parameters, and updating the shared set of model parameters comprises updating the shared set of model parameters to optimize an objective function that measures a performance on the particular machine learning task of the candidate network architectures defined by the sets of decision values sampled from the probability distributions generated using the set of controller policy parameters;

after the joint updating, selecting, as the network architecture for the neural network, a candidate network architecture that is defined by respective particular decision values for each of the first plurality of categorical decisions; and selecting, as the hardware architecture for the hardware accelerator, a candidate hardware architecture that is defined by respective particular decision values for each of the second plurality of categorical decisions.

19. The method of claim 18, further comprising receiving data specifying a target latency for performing the particular machine learning task by the neural network when being deployed on the hardware accelerator.

20. The method of claim 18, wherein the reward function includes a quality term that measures the (i) the estimated quality of the candidate hardware architecture and (ii) the estimated quality of the candidate network architecture, and a latency term that is based on a ratio between an estimated latency of the candidate architecture and the target latency.

21. The method of claim 18, wherein the joint updating comprises repeatedly performing operations comprising:

determining, using the validation data, an estimated quality on the particular machine learning task of a neural network having a candidate architecture that has a subset of the shared set of model parameters that is defined by the selected decision values for the first plurality of categorical decisions, wherein the quality is estimated in accordance with current values of the subset of the shared set of model parameters that is defined by the selected decision values for the first plurality of categorical decisions.

22. The method of claim 18, wherein the joint updating comprises repeatedly performing operations comprising:

determining, using the validation data and a latency simulator, an estimated latency when performing the particular machine learning task of the neural network having the candidate network architecture that has the subset of the shared set of model parameters that is defined by the selected decision values for the first plurality of categorical decisions, wherein the neural network is deployed on the hardware architecture having the hardware architecture that has the subset of the shared set of model parameters that is defined by the selected decision values for the second plurality of categorical decisions.

23. The method of claim 18, wherein the joint updating comprises repeatedly performing operations comprising:

determining, using an area simulator, an estimated quality of the candidate hardware architecture that has the subset of the shared set of model parameters that is defined by the selected decision values for the second plurality of categorical decisions.

24. The method of claim 22, wherein the latency simulator and the area simulator are each a respective neural network trained on labelled training data generated using an accelerator simulator.

25. A machine learning task-specific hardware accelerator having an architecture defined by performing a process comprising:

receiving data specifying one or more target hardware constraints of a hardware accelerator on which a neural network for performing a particular machine learning task is to be deployed;

receiving training data and validation data for the particular machine learning task; and selecting, from a space of candidate network architectures and using the training data and the validation data, a network architecture for the neural network for performing the particular machine learning task, selecting, from a space of candidate hardware architectures, a hardware architecture for the hardware accelerator on which the neural network performing the particular machine learning task is to be deployed, wherein each candidate network architecture in the space is defined by a corresponding set of decision values that includes a respective decision value for each of a first plurality of categorical decisions, wherein each candidate hardware architecture in the space is defined by a corresponding set of decision values that includes a respective decision value for each of a second plurality of categorical decisions, and wherein the selecting comprises:

jointly updating (i) a set of controller policy parameters that define, for each of the first and second plurality of categorical decisions, a respective probability distribution over decision values for the categorical decision and (ii) a shared set of model parameters shared by the candidate network architectures in the space, wherein each candidate network architecture in the space is configured to perform a set of operations that use a different subset of the shared set of model parameters defined by the respective decision values for the first plurality of categorical decisions, wherein:

updating the set of controller policy parameters comprises updating the set of controller policy parameters through reinforcement learning to maximize a reward function that measures (i) an estimated quality of a candidate hardware architecture and (ii) an estimated quality of a candidate network architecture defined by sets of decision values sampled from probability distributions generated using the set of controller policy parameters, and updating the shared set of model parameters comprises updating the shared set of model parameters to optimize an objective function that measures a performance on the particular machine learning task of the candidate network architectures defined by the sets of decision values sampled from the probability distributions generated using the set of controller policy parameters;

after the joint updating, selecting, as the network architecture for the neural network, a candidate network architecture that is defined by respective particular decision values for each of the first plurality of categorical decisions; and selecting, as the hardware architecture for the hardware accelerator, a candidate hardware architecture that is defined by respective particular decision values for each of the second plurality of categorical decisions.

26. The machine learning task-specific hardware accelerator of claim 25, wherein the machine learning task-specific hardware accelerator is a tensor processing unit or a graphics processing unit.

* * * * *